(12) United States Patent
Kanbayashi et al.

(10) Patent No.: US 11,833,864 B2
(45) Date of Patent: Dec. 5, 2023

(54) TIRE PRESSURE MONITORING SYSTEM

(71) Applicant: DENSO CORPORATION, Kariya (JP)

(72) Inventors: Ryosuke Kanbayashi, Kariya (JP);
Takatoshi Sekizawa, Kariya (JP);
Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 430 days.

(21) Appl. No.: 17/224,197

(22) Filed: Apr. 7, 2021

(65) Prior Publication Data

US 2021/0221186 A1 Jul. 22, 2021

Related U.S. Application Data

(63) Continuation of application No. PCT/JP2019/039895, filed on Oct. 9, 2019.

(30) Foreign Application Priority Data

Oct. 10, 2018 (JP) ................................. 2018-192061

(51) Int. Cl.
*B60C 23/04* (2006.01)

(52) U.S. Cl.
CPC ...... *B60C 23/0416* (2013.01); *B60C 23/0462* (2013.01); *B60C 23/0488* (2013.01)

(58) Field of Classification Search
CPC ................................................ B60C 23/0462
See application file for complete search history.

(56) References Cited

U.S. PATENT DOCUMENTS

| | | | |
|---|---|---|---|
| 2003/0156021 A1* | 8/2003 | Tabata | ................ B60C 23/0416 340/442 |
| 2003/0197604 A1 | 10/2003 | Ogawa et al. | |
| 2016/0229236 A1 | 8/2016 | Taki | |
| 2019/0279497 A1 | 9/2019 | Sekizawa et al. | |

FOREIGN PATENT DOCUMENTS

| | | |
|---|---|---|
| EP | 3202600 A1 | 8/2017 |
| JP | 2003240660 A | 8/2003 |
| JP | 2003312220 A | 11/2003 |
| JP | 2007015454 A | 1/2007 |
| JP | 2012210912 A | 11/2012 |
| JP | 2013006588 A | 1/2013 |
| JP | 2016144961 A | 8/2016 |
| JP | 2018016300 A | 2/2018 |

* cited by examiner

*Primary Examiner* — Daniell L Negron
(74) *Attorney, Agent, or Firm* — Harness, Dickey & Pierce, P.L.C.

(57) ABSTRACT

A transceiver of a spare wheel includes a sensing unit having a pressure sensor and an acceleration sensor configured to output a detection signal according to a tire pressure of the spare wheel and an acceleration generated in the spare wheel, a first control unit configured to create a frame that processes the detection signal indicating the tire pressure and stores it as data related to the tire pressure, and a first transmitter receiver configured to transmit the frame. A receiver includes a second transceiver configured to receive a frame and transmit a response signal indicating that the frame is received and a second control unit configured to detect the tire pressure and transmit a response signal from the second transceiver when the frame is received.

7 Claims, 5 Drawing Sheets

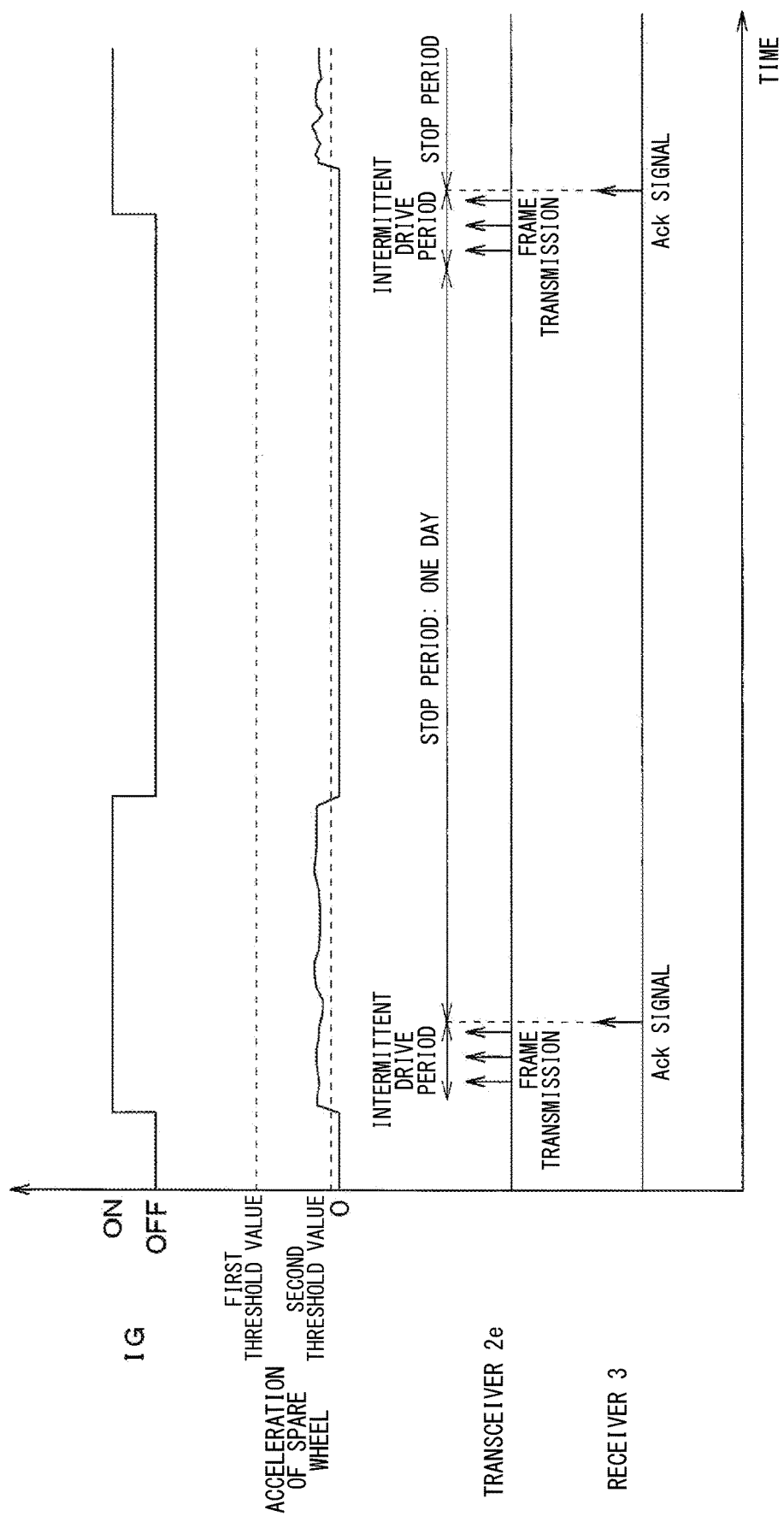

TIRE PRESSURE MONITORING SYSTEM

CROSS REFERENCE TO RELATED APPLICATIONS

This application is a continuation application of International Patent Application No. PCT/JP2019/039895 filed on Oct. 9, 2019, which designated the U.S. and based on and claims the benefits of priority of Japanese Patent Application No. 2018-192061 filed on Oct. 10, 2018. The entire disclosure of all of the above applications is incorporated herein by reference.

TECHNICAL FIELD

The present disclosure relates to a tire pressure monitoring system (hereinafter referred to as TPMS).

BACKGROUND

As one of the TPMS, there is a direct type described below. This type of TPMS has a configuration in which a transmitter equipped with a sensing unit such as a pressure sensor is directly attached to a wheel side to which a tire is attached, and an antenna and a receiver are attached to a vehicle body side. Then, when a data indicating a detection result of the pressure sensor is transmitted from the transmitter, the data is received to the receiver via the antenna, and the tire pressure is detected.

SUMMARY

An object of a present disclosure is to provide a TPMS capable of reliably receiving data at a receiver while reducing current consumption.

A TPMS in one aspect of the present disclosure includes a transceiver provided on a spare wheel in a vehicle and a receiver provided on a vehicle body. The transceiver includes a sensing unit having a pressure sensor configured to output a detection signal indicating a tire pressure of the spare wheel and an acceleration sensor configured to output a detection signal according to the acceleration generated in the spare wheel, a first control unit configured to create a frame that processes the detection signal indicating the tire pressure and stores it as data related to the tire pressure, and a first transceiver configured to transmit the frame. Further, the receiver includes a second transceiver configured to receive a frame and transmit a response signal indicating that the frame is received and a second control unit configured to detect the tire pressure based on the data related to the tire pressure stored in the frame and transmit a response signal from the second transceiver when the frame is received. Then, after the transceiver performs frame transmission in an intermittent drive cycle in which frame transmission is performed at predetermined transmission cycles, upon receiving the response signal, the transceiver sets a stop period longer than the transmission cycle of the intermittent drive cycle, and stops the frame transmission during the stop period.

BRIEF DESCRIPTION OF DRAWINGS

FIG. 6 is a time chart showing a transmission reception relationship between a spare wheel and a receiver when the frame transmission process or the frame reception process is performed.

DETAILED DESCRIPTION

Figure 1:
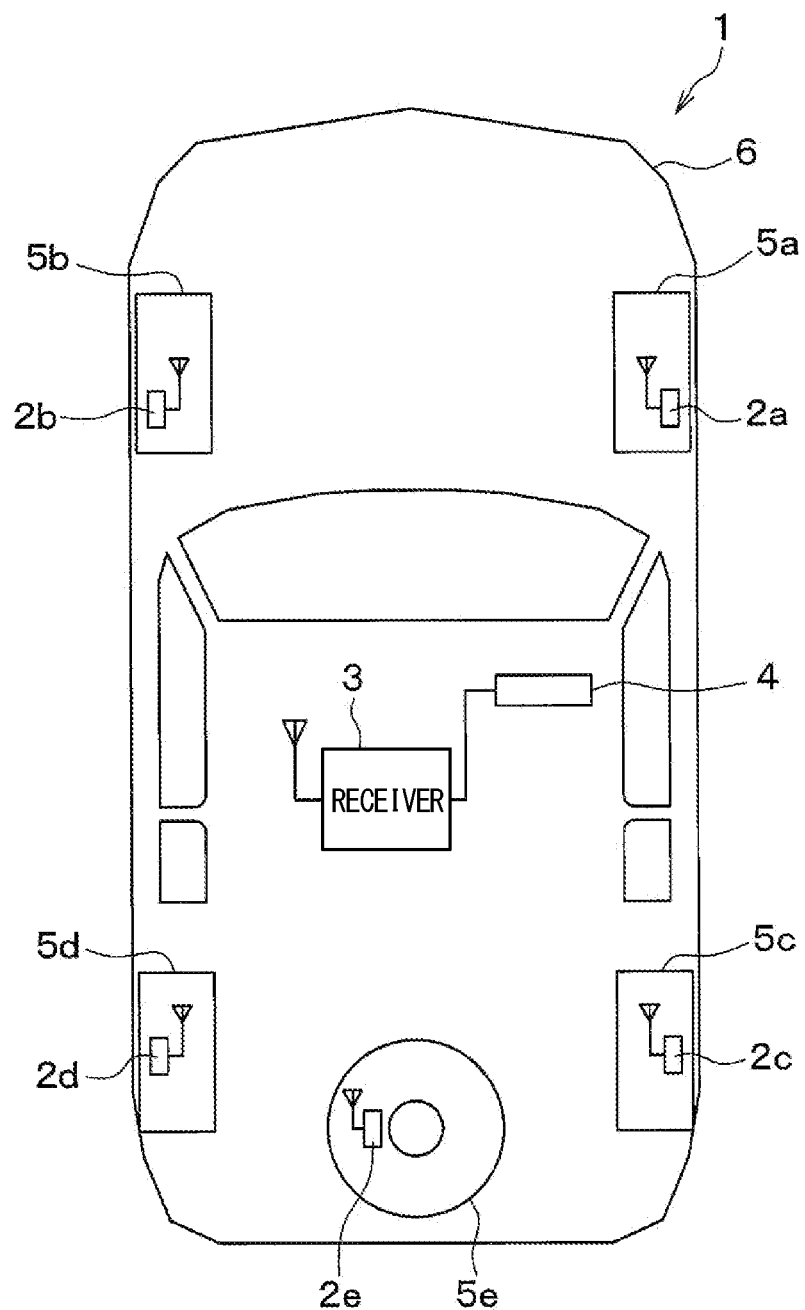
FIG. 1 is a diagram showing an overall configuration of a TPMS according to a first embodiment.

In an assumable example, as one of the TPMS, there is a direct type described below. This type of TPMS has a configuration in which a transmitter equipped with a sensing unit such as a pressure sensor is directly attached to a wheel side to which a tire is attached, and an antenna and a receiver are attached to a vehicle body side. Then, when a data indicating a detection result of the pressure sensor is transmitted from the transmitter, the data is received to the receiver via the antenna, and the tire pressure is detected.

In such a TPMS, the tire pressure is regularly measured not only for the traveling wheel but also for the spare wheel used in an emergency and it is necessary to transmit a data related to the tire pressure from the transmitter on the wheel side to the receiver on the vehicle body side.

For example, a TPMS in which the data transmission is performed from both the transmitter of the traveling wheel and that of the spare wheel is proposed. In this TPMS, the transmitter is equipped with an acceleration sensor, and if the detected acceleration is 5G or more, which is a threshold value for travel determination, it is determined that the vehicle is traveling. Data is transmitted from the transmitter of the traveling wheel determined to be traveling at each periodic transmission cycle, and data is transmitted from the transmitter of the spare wheel determined not to be traveling when a predetermined condition is satisfied. That is, for the spare wheel, since the detected acceleration does not exceed the threshold value for travel determination, the points set according to the acceleration are accumulated at predetermined intervals. Data is transmitted when the cumulative value exceeds the threshold value for determining the traveling performance.

In the direct type TPMS, since the transmitter is provided on the tire side, a battery such as a button battery is used as a power source, and a decrease in battery life due to an increase in the number of transmissions becomes an issue. For this reason, it is necessary to set the transmission frequency in consideration of the battery life while ensuring that data can be received by the receiver, and therefore, it is difficult to satisfy both requirements. Further, the transmitter may be provided with a generator or a storage battery, but even in that case, it is desired to reduce the current consumption in consideration of the miniaturization of the device.

On the other hand, in the above-mentioned TPMS, when the acceleration does not exceed the threshold for travel judgment, the points are accumulated and the data is transmitted. Therefore, it is necessary to continuously measure the acceleration, and the current consumption cannot be sufficiently reduced. Further, even if the data is transmitted from the transmitter, it is unknown whether the data has reached the receiver, and it is necessary to repeatedly transmit the data from the transmitter, so that the reduction of the current consumption becomes further insufficient.

An object of the present disclosure is to provide a TPMS capable of reliably receiving data at the receiver while reducing current consumption.

A TPMS in one aspect of the present disclosure includes a transceiver provided on a spare wheel in a vehicle and a receiver provided on a vehicle body. The transceiver includes a sensing unit having a pressure sensor configured to output a detection signal indicating a tire pressure of the spare wheel and an acceleration sensor configured to output a detection signal according to the acceleration generated in the spare wheel, a first control unit configured to create a frame that processes the detection signal indicating the tire pressure and stores it as data related to the tire pressure, and a first transceiver configured to transmit the frame. Further, the receiver includes a second transceiver configured to receive a frame and transmit a response signal indicating that the frame is received and a second control unit configured to detect the tire pressure based on the data related to the tire pressure stored in the frame and transmit a response signal from the second transceiver when the frame is received. Then, after the transceiver performs frame transmission in an intermittent drive cycle in which frame transmission is performed at predetermined transmission cycles, upon receiving the response signal, the transceiver sets a stop period longer than the transmission cycle of the intermittent drive cycle, and stops the frame transmission during the stop period.

In such a configuration, bidirectional communication is possible between the transceiver and the receiver of the spare wheel. Therefore, when the frame is received, the receiver returns a response signal to the transceiver, so that the transceiver can accurately grasp that the frame transmitted by itself has been received by the receiver.

Then, when the response signal arrives, the transceiver is put into a sleep state during a predetermined stop period so that it is not necessary to repeatedly transmit frames even after the receiver receives frames. Therefore, it is possible to obtain a TPMS that can reliably receive data at the receiver while reducing power consumption.

Hereinafter, embodiments of the present disclosure will be described with reference to the drawings. In the following embodiments, the same or equivalent parts are denoted by the same reference numerals.

First Embodiment

A first embodiment of the present disclosure will be described with reference to FIGS. 1 to 6. In FIG. 1, an upper direction on the page corresponds to a front of a vehicle, a lower direction on the page corresponds to a rear of the vehicle, and a right-and-left direction on the page corresponds to a right-and-left direction of the vehicle.

A TPMS (tire pressure monitoring system) illustrated in FIG. 1 is installed on a vehicle 1 and includes transceivers 2a to 2e, a receiver 3, and a display 4.

As shown in FIG. 1, the transceiver 2a to 2d are attached to the traveling wheels 5a to 5d of the vehicle 1 respectively, and the transceiver 2e is attached to the spare wheel 5e. Each of these transceivers 2a to 2e detects the air pressure of the tires attached to the traveling wheels 5a to 5d or the spare wheels 5e, and stores a detection signal data indicating the detection result in a frame and transmits it. Each transceiver 2a to 2e has the same configuration, but an ID information including transceiver specific identification information for identifying each transceiver 2a to 2e and vehicle specific identification information for identifying own vehicle is attached individually to each transceiver. ID information is attached to the frames transmitted from each of the transceivers 2a to 2e, and it is possible to determine from which transceivers 2a to 2e the frame received on the receiver 3 side is transmitted.

Further, the receiver 3 is attached to a vehicle body 6 side of the vehicle 1, receives frames transmitted from the transceivers 2a to 2e, and performs various processes, calculations, etc. based on the detection signals stored in the frames so as to detect the tire pressure. Further, the transceivers 2a to 2e and the receiver 3 according to the present embodiment are capable of performing not only communication from the transceiver 2a to 2e to the receiver 3 but also two way communication that can be vice versa. Therefore, it is also possible to respond that a frame has been received from the receiver 3 to the transceivers 2a to 2e. Various forms of bidirectional communication can be applied, such as Bluetooth communication including BLE (Bluetooth Low Energy) communication, wireless LAN (Local Area Network) such as wifi, Sub-GHz communication, ultra wide-band Communication, ZigBee, etc. can be applied. "Bluetooth" is a registered trademark. Hereinafter, the detailed configurations of the transceivers 2a to 2e and the receiver 3 will be described with reference to FIGS. 2 and 3.

Figure 2:
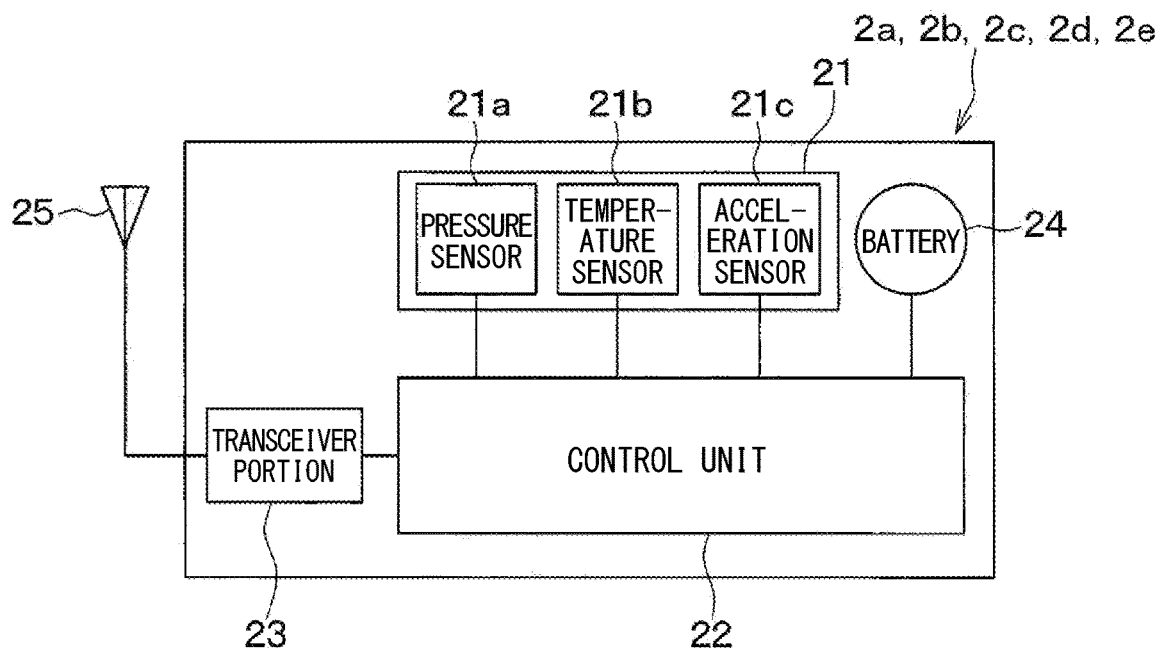
FIG. 2 is a diagram illustrating a block configuration of a transceiver.

As illustrated in FIG. 2, each of the transceivers 2a to 2e is configured to include a sensing unit 21, a control unit 22, a transceiver portion 23, a battery 24, and an antenna 25, and each of these units is driven based on power supplied from the battery 24.

The sensing unit 21 is configured to include, for example, a pressure sensor 21a, a temperature sensor 21b, and an acceleration sensor 21c. The pressure sensor 21a outputs a detection signal according to the tire pressure. The temperature sensor 21b outputs a detection signal according to the temperature inside the tire. The acceleration sensor 21c outputs a detection signal corresponding to the acceleration generated by the rotation of the tire, for example, the radial acceleration of each of the traveling wheels 5a to 5d. Regarding the spare wheel 5e, the acceleration sensor 21c outputs a detection signal according to the acceleration generated by vibration during traveling, but since the acceleration associated with the tire rotation is not applied, an acceleration smaller than the acceleration generated by the tire rotation will be detected. Then, the sensing unit 21 transmits the detection signals output by the pressure sensor 21a, the temperature sensor 21b, and the acceleration sensor 21c to the control unit 22.

Among these, a detection signal corresponding to the tire air pressure and a detection signal corresponding to the tire interior temperature are used to detect the tire air pressure, while a detection signal corresponding to the acceleration is used to detect that the vehicle 1 is traveling.

The control unit 22 corresponds to the first control unit, is composed of a well-known computer equipped with a CPU, ROM, RAM, timer, I/O, etc., and performs predetermined process according to a program stored in a memory such as ROM. In the memory in the control unit 22, ID information including the transceiver specific identification information for identifying each transceiver 2a to 2e and the vehicle specific identification information for identifying the own vehicle is stored.

The control unit 22 receives the detection signal output from the sensing unit 21, processes the detection signal as well as processing it as necessary. Then, the control unit 22 stores data indicating the detection results of the tire pressure and the tire temperature inside the tire used for detecting the tire pressure in the frame together with the ID information of each transceiver 2a to 2d, and sends the frame to the transceiver portion 23 at a predetermined timing. Further, the control unit 22 itself may determine the decrease in tire pressure. In that case, the control unit 22 also stores data indicating whether or not the tire pressure has dropped in the frame and sends it to the transceiver portion 23. For example, when the control unit 22 compares the tire air pressure converted to a predetermined reference temperature with a predetermined warning threshold Th, and detects that the tire pressure has dropped to the warning threshold Th or less, the control unit 22 stores the data indicating that the tire pressure drop occurs in the frame.

In the following description, the data showing the detection result of the tire pressure and the temperature inside the tire and the data showing the presence or absence of the occurrence of the tire pressure drop are referred to as the data related to the tire pressure. However, it is not always necessary for the data related to the tire pressure to include all of these data, only one of the data showing the detection result of the tire pressure and the temperature inside the tire and the data showing whether or not the tire pressure has dropped.

Further, the control unit 22 uses the acceleration detection result for determining whether or not the vehicle is traveling. For example, when the acceleration sensor 21c outputs a detection signal corresponding to the acceleration in the radial direction of the traveling wheels 5a to 5d and the spare wheel 5e, the detection signal of the acceleration sensor 21c of each wheel contains the following components. That is, in the case of the acceleration sensor 21c of the traveling wheels 5a to 5d, the detection signal includes a center of gravity acceleration component and a centrifugal acceleration component. On the other hand, in the case of the acceleration sensor 21c of the spare wheel 5e, the detection signal does not include the centrifugal acceleration component, and if the spare wheel 5e is mounted horizontally on the vehicle 1, the detection signal does not also include the center of gravity acceleration component. Therefore, the detection signal includes an acceleration component according to the vibration due to traveling. The absolute value of the acceleration component according to the vibration due to traveling appears as a value exceeding a predetermined first threshold value, for example, 1 G, and the acceleration component including the center of gravity acceleration component and the centrifugal acceleration component associated with tire rotation appears as a value exceeding a predetermined second threshold value, for example, 8G.

Therefore, if the absolute value of the acceleration detected based on the detection signal of the acceleration sensor 21c exceeds the first threshold value, the control unit 22 determines that the vibration which can occur during traveling, that is, the vibration which is larger than the vibration that is larger than the vibration can occur when the vehicle is stopped is generated. Further, if the absolute value of the detected acceleration exceeds the second threshold value larger than the first threshold value, the control unit 22 determines that the acceleration due to the tire rotation is generated beyond the acceleration due to the vibration that may simply occur during traveling.

Based on the above determination, the control unit 22 determines whether it is the transceiver 2a to 2d attached to the traveling wheels 5a to 5d or the transceiver 2e attached to the spare wheel 5e. Then, if the control unit 22 is of the transceiver 2a to 2d attached to the traveling wheels 5a to 5d, the control unit 22 transmits data to the transceiver portion 23 at a predetermined periodic transmission cycle corresponding to the traveling wheels 5a to 5d, and sends the frame at that timing. Furthermore, when at least one of the change in tire pressure and the decrease in tire pressure occurs, the transmission cycle is set to be shorter than the periodic transmission cycle before that, and the change or decrease in tire pressure can be transmitted to the receiver 3 in a shorter time. For example, when the control unit 22 determines that a change in the tire pressure has occurred when the amount of change corresponding to the decrease value or the increase amount of the tire pressure from the tire pressure at the time of the previous data transmission of the tire pressure exceeds a predetermined threshold value. Further, the control unit 22 determines that the tire air pressure has decreased when the tire air pressure becomes equal to or less than a predetermined set value.

Further, if the control unit 22 is of the transceiver 2e attached to the spare wheel 5e, the control unit 22 transmits data to the transceiver portion 23 at a timing corresponding to the spare wheel 5e, and performs the data transmission at that timing. The transmission timing in the transceiver 2e of the spare wheel 5e will be described in detail later.

The transceiver portion 23 functions as an output unit that transmits the frame sent from the control unit 22 as an RF radio waves to the receiver 3 through the antenna 25. The transceiver portion 23 also functions as an input unit that receives an instruction signal from the receiver 3 as an RF radio wave. Although the transceiver portion 23 is described here as one configuration, but may be configured separately as a transmission unit and a reception unit. The transceiver portion 23 transmits/receives using radio waves in a communication band of 2.4 GHz used in, for example, BLE. The process of sending a signal from the control unit 22 to the transceiver portion 23 is performed according to the above program, and the process of sending a signal from the control unit 22 to the transceiver portion 23 is executed.

The battery 24 supplies electric power to the sensing unit 21, the control unit 22, and the like, so that the sensing unit 21 collects data regarding the tire air pressure, and the control unit 22 executes various calculations or the like while receiving the electric power from the battery 24.

The transceivers 2a to 2e configured as mentioned above are attached to, for example, air injection valves in the wheels of the traveling wheels 5a to 5d and the spare wheels 5e, and are arranged so that the sensing unit 21 is exposed inside the tire. As a result, the transceivers 2a to 2e detect the tire pressure of the corresponding wheel and transmit the frame at a predetermined timing through the antenna 25 provided in each of the transceivers 2a to 2e.

Figure 3:
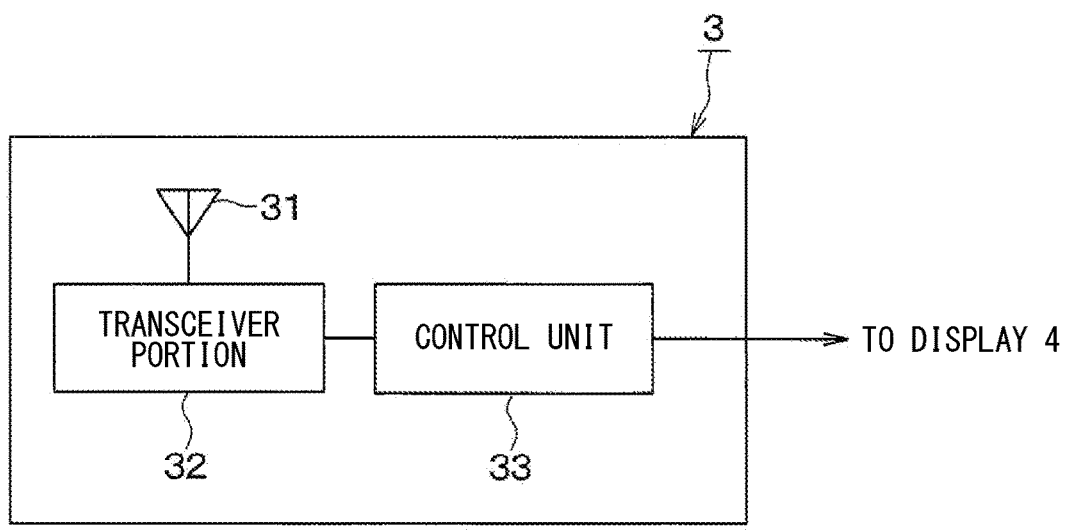
FIG. 3 is a diagram illustrating a block configuration of a receiver.

On the other hand, as shown in FIG. 3, the receiver 3 has a configuration including an antenna 31, a transceiver portion 32, and a control unit 33.

The antenna 31 is provided in the vehicle body 6, and receives a frame sent from each of the transceivers 2a to 2e, and transmits receives an Ack signal to each of the transceivers 2a to 2e as a response signal indicating that the frame reception is completed. Here, the antenna 31 is composed of one common antenna that comprehensively transmits and receives to and from the transceivers 2a to 2e, but the antenna may be provided for each of the transceivers 2a to 2e, or may be configured separately for transmission and reception.

When the frame transmitted from the transceivers 2a to 2e is received by the antenna 31, the transceiver portion 32 functions as an input unit that inputs the frame and sends it to the control unit 33. Further, the transceiver portion 32 also functions as an output unit that transmits the Ack signal for frame transmission to each of the transceivers 2a to 2e according to an instruction from the control unit 33. Although the transceiver portion 32 is configured to be capable of both transmission and reception here, the transceiver portion 32 may be configured separately by transmission portion and the reception portion.

The control unit 33 corresponds to the second control unit, is composed of a well-known computer equipped with a CPU, ROM, RAM, I/O, timer, etc., and executes various processes according to a program stored in the ROM or the like. Specifically, the control unit 33 operates based on the power supply from a battery (not shown). The control unit 33 receives the frame and transmits the Ack signal in the transceiver portion 32, and performs various processes related to tire pressure detection.

For example, the control unit 33 performs receiver process including reception confirmation process and pressure detection process as various processes related to tire pressure detection.

In the reception confirmation process, it is confirmed that the frames transmitted from the transceivers 2a to 2e have been received. Then, when the frame reception is completed, the control unit 33 confirms the reception by returning the Ack signal indicating that the frame has been received to the transceivers 2a to 2d. Further, when the control unit 33 receives the frame transmitted from the transceiver 2e, the control unit 33 confirms the reception by returning the Ack signal indicating that the frame has been received to the transceiver 2e. Since the ID information is attached to the frame transmitted from the transceivers 2a to 2e, the ID information stored in the received frame is attached to the Ack signal based on the ID information. Therefore, each of the transceivers 2a to 2e that have received the Ack signal can confirm whether or not the frame received by the receiver 3 is transmitted by itself.

Further, when the frame is received, the control unit 33 shifts to the pressure detection process. In the pressure detection process, the tire pressure is obtained by performing various signal process and calculations based on the data related to the tire pressure stored in the frame received from the transceiver portion 32. Then, an electric signal corresponding to the obtained tire pressure is output to the display 4. For example, the control unit 33 compares the obtained tire pressure with the predetermined warning threshold Th, and when it detects that the tire pressure is the predetermined warning threshold Th or less, a signal that is has been detected is output to the display 4. Further, when the tire pressure is detected by the transceivers 2a to 2e, it is also possible to inform the display 4 that the tire pressure drop has occurred based on the data indicating that the tire pressure drop included in the received frame has occurred.

Further, when the control unit 33 obtains the tire pressures of the four traveling wheels 5a to 5d and the spare wheels 5e, the control unit 33 outputs the tire pressures to the display 4 in association with the traveling wheels 5a to 5d and the spare wheels 5e. In the memory of the control unit 33, the ID information of the transceivers 2a to 2e arranged on the traveling wheels 5a to 5d and the spare wheels 5e is stored in association with the positions of the traveling wheels 5a to 5d and the spare wheels 5e. Therefore, the control unit 33 recognizes which of the traveling wheels 5a to 5d and the spare wheels 5e the received frame is the frame of the transceiver 2a to 2e attached to by collating with the ID information stored in the frame, and the control unit 33 can identify the wheel whose tire pressure has dropped. Based on the above processes, when the tire pressure drop occurs, the lowered wheel is identified and output it to the display 4. Further, even when the tire pressure drop does not occur, the obtained tire pressure may be associated with the traveling wheels 5a to 5d and the spare wheels 5e and output it to the display 4.

In this way, it is transmitted to the display 4 that the tire pressure of any of the four traveling wheels 5a to 5d and the spare wheel 5e has decreased, or the tire pressure of each of the four traveling wheels 5a to 5d and the spare wheel 5e is transmitted to the display 4.

The display 4 is disposed in a place visible to a driver as illustrated in FIG. 1 and configured by using, for example, a warning lamp provided in an instrument panel in the vehicle 1. When a signal indicating that the tire pressure has decreased is sent from the control unit 33 of the receiver 3, for example, the display 4 notifies the driver of the decrease in the tire pressure by displaying the above signal. Alternatively, when the tire pressures of the four traveling wheels 5a to 5d are transmitted from the receiver 3, the tire pressures of the four traveling wheels 5a to 5d are displayed in correspondence with each of the traveling wheels 5a to 5d.

The display 4 is used as an alert unit for alerting the driver in the present embodiment. However, a device for audibly alerting, such as a speaker, may be used as the alerting unit, in addition to a device for visually alerting, such as the display 4.

As described above, the TPMS according to the present embodiment is configured. Subsequently, the operation of the TPMS of the present embodiment will be described.

For example, when an ignition switch (not shown) is turned on, the receiver 3 and the like are operated by the power supply from the battery. As a result, the control unit 33 executes the receiver process. Specifically, in the receiver process, when a frame is transmitted from each of the transceivers 2a to 2e, the frame is received, the Ack signal indicating reception completion as a reception confirmation process is returned, and the tire pressure detection as a pressure detection process is performed. The receiver process will be described later.

On the other hand, in each of the transceivers 2a to 2e, the sensing unit 21 and the control unit 22 are driven by the power supply from the battery 24. In the sensing unit 21, data on tire pressure is collected, and in the control unit 22, the frame transmission process is executed. At this time, in each of the transceivers 2a to 2e, the control unit 22 is normally in a sleep state in order to improve the life of the battery 24, and is put into a wake-up state at a predetermined timing to execute various processes.

First, it is not known whether the control unit 22 of each transceiver 2a to 2e is that of the transceivers 2a to 2e attached to the traveling wheels 5a to 5d, or that of the transceiver 2e attached to the spare wheel 5e. Therefore, the control unit 22 enters the wake-up state at predetermined control cycles, or enters the wake-up state when only the acceleration sensor 21c is activated and acceleration equal to or higher than a predetermined threshold value occurs. Then, the control unit 22 determines whether it is the transceivers 2a to 2d attached to the traveling wheels 5a to 5d or the transceiver 2e attached to the spare wheel 5e.

Specifically, the control unit 22 determines that the vehicle is not in the traveling state if the absolute value of the detected acceleration does not exceed the first threshold value when the control unit 22 enters the wake-up state. Therefore, it is impossible to distinguish the traveling wheels 5a to 5d from the spare wheel 5e. In this case, the control unit 22 ends the process without transmitting data. Further, the control unit 22 determines that the vehicle is in the traveling state if the absolute value of the detected acceleration exceeds the first threshold value when the control unit 22 enters the wake-up state. Therefore, it is possible to distinguish the traveling wheels 5a to 5d from the spare wheel 5e. Therefore, the control unit 22 determines whether the absolute value of the detected acceleration exceeds the second threshold value or whether the state of not exceeding the second threshold value continues for a certain period of time. In the former case, it indicates that acceleration due to tire rotation is generated, and in the latter case, it indicates that acceleration due to tire rotation is not generated, and acceleration representing vibration that can occur during traveling is generated. Since it is judged to be the transceivers 2a to 2d in the former case, the control unit 22 determines that it is attached to the traveling wheels 5a to 5d. Further, since it is judged to be the transceiver 2e in the latter case, the control unit 22 determines that it is attached to the spare wheel 5e. Then, the control unit 22 executes the frame transmission process according to the determination result.

For example, if the control unit 22 is of the transceiver 2a to 2d attached to the traveling wheels 5a to 5d, the control unit 22 transmits data on the tire pressure to the transceiver portion 23 at a predetermined periodic transmission cycle corresponding to the traveling wheels 5a to 5d, and performs the frame transmission at that timing. Further, in a case where the control unit 22 detects the tire air pressure by itself, when the tire air pressure changes or the tire air pressure drops, the control unit 22 transmits the data on the air pressure to the transceiver portion 23 with a shorter transmission cycle than before. By this process, the frames are transmitted from the transceivers 2a to 2d of the traveling wheels 5a to 5d, the frames are received in the receiver 3. When the Ack signal arrives from the receiver 3, the frame transmission from the transceiver 2a to 2d is completed. As a result, the control unit 22 goes into the sleep state again until the next transmission cycle comes and the wake-up state is entered.

Further, if the control unit 22 is of the transceiver 2e attached to the spare wheel 5e, the control unit 22 transmits data to the transceiver portion 23 at a timing corresponding to the spare wheel 5e, and performs the data transmission at that timing. By this process, the frame is transmitted from the transceiver 2e of the spare wheel 5e, the frame is received in the receiver 3. When the Ack signal arrives from the receiver 3, the frame transmission from the transceiver 2e is completed. As a result, the control unit 22 goes into the sleep state again.

At this time, if the Ack signal does not arrive, the control unit 22 goes into the sleep state once for a predetermined period as the intermittent drive period, but repeatedly enters a wake-up state for the intermittent drive cycle during a relatively short cycle of, for example, 96 seconds, and performs frame transmission. Therefore, the frame transmission is repeatedly performed until the Ack signal arrives, and the frame transmitted from the transceiver 2e can be reliably received to the receiver 3.

Further, when the Ack signal arrives, the control unit 22 goes into the sleep state during a predetermined stop period. The stop period at this time is a time longer than the intermittent drive cycle defined in the intermittent drive period, for example, one day, that is, 24 hours. Although it is desired to be able to detect the tire pressure of the spare wheel 5e, it is not necessary to be able to detect it frequently, for example, it is sufficient to detect the tire pressure once a day. In addition, when the user uses the vehicle, it is often used at the same time zone, and after the tire pressure is detected, it is assumed that the tire pressure can be detected one day after that. Therefore, the stop period is set to one day.

Here, if the unidirectional communication is such that only the frame transmission from the transceiver 2e is performed and the Ack signal is not returned from the receiver 3, it is unclear whether the receiver 3 can receive the frame if the frame is transmitted from the transceiver 2e only once a day. However, if a bidirectional communication is performed between the transceiver 2e and the receiver 3 as in the present embodiment, the transceiver 2e can detect that the frame reception has been performed by the receiver 3. Therefore, even after the frame is received by the receiver 3, it is not necessary to repeatedly transmit the frame from the transceiver 2e, and it is possible to reduce the power consumption.

The control unit 22 in the spare wheel 5e can also be configured to be able to detect the tire pressure by itself. In that case, even if the control unit 22 provides the stop period, if it is determined that the tire pressure is changing or the tire pressure is decreasing, as an interrupt process, the frame transmission of data related to the tire pressure is performed every transmission cycle having a relatively short cycle of, for example, 96 seconds. As a result, the frame transmission can be performed even at the timing when the frame transmission is not normally performed during the stop period, and in an emergency, changes in the tire pressure can be transmitted to the receiver 3 at shorter time intervals.

Figure 4:
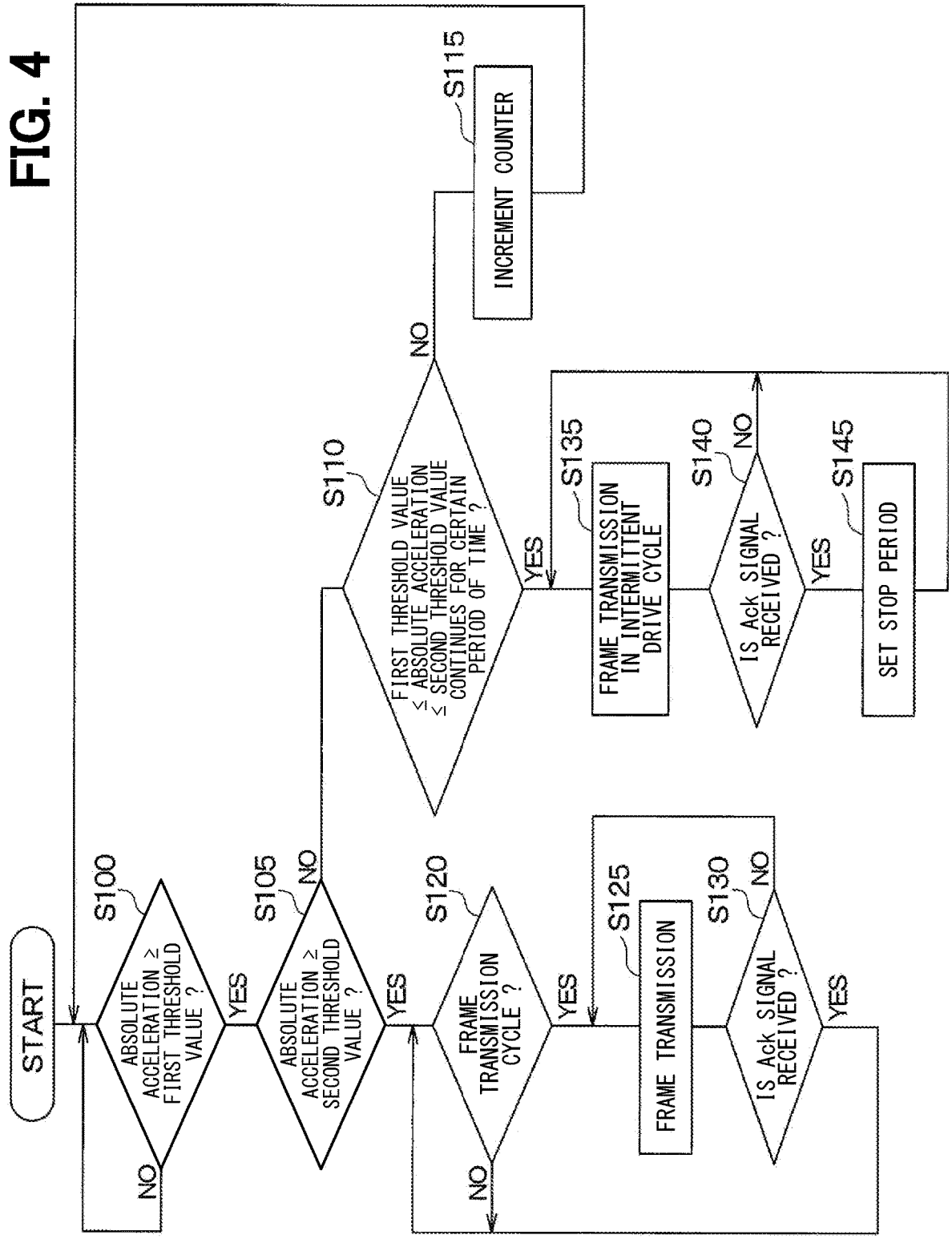
FIG. 4 is a flowchart of a frame transmission process executed by a control unit of a transceiver.

FIG. 4 is a flowchart showing details of the frame transmission process executed by the control unit 22. This process is executed at predetermined control cycles when the control unit 22 switches from the sleep state to the wake-up state at a predetermined timing.

As shown in FIG. 4, first, in step S100, it is determined whether or not an absolute value of the acceleration detected by the acceleration sensor 21c exceeds a first threshold value, and if it does not exceed, the vehicle is not in the traveling state, this step repeats. Then, if an affirmative determination is made in step S100, the process proceeds to step S105 to determine whether or not the absolute value of the detected acceleration exceeds a second threshold value.

If an affirmative determination is made here, it is considered that the control unit 22 is of the transceiver 2a to 2d attached to the traveling wheels 5a to 5d. On the other hand, if a negative determination is made, the control unit 22 may be of the transceiver 2e attached to the spare wheel 5e. Therefore, the process proceeds to step S110, and it is determined whether or not the state in which the absolute value of the detected acceleration is larger than the first threshold value and smaller than the second threshold value continues for a certain period of time. The certain period of time at this time is measured by a count of a timer provided in the control unit 22, and if a count value of a counter reaches a predetermined value, it is determined that the certain period of time has continued. Here, if the predetermined time has not been reached for the certain period of time, the process proceeds to step S115 to increment the counter. Then, when a positive determination is made in step S110, the control unit 22 determines that the transceiver 2e is attached to the spare wheel 5e. In this way, the control unit 22 determines whether it is the transceiver 2a to 2d of the traveling wheels 5a to 5d or the transceiver 2e of the spare wheel 5e. If an affirmative determination is made in step S110, the counter used in step S115 is reset to 0.

If an affirmative determination is made in step S105, the process proceeds to step S120 to determine whether or not the frame transmission cycle is reached. The periodic transmission cycle is set except when the tire pressure changes or the tire pressure decreases, and in that case, it is determined whether or not the periodic transmission cycle has been reached. Further, when the tire air pressure changes or the tire air pressure decreases, the transmission cycle shorter than the periodic transmission cycle is set, and in that case, it is determined whether or not the shorter transmission cycle has been reached.

If an affirmative determination is made here, the process proceeds to step S125, and a process of transmitting a frame storing data related to tire pressure and ID information to the receiver 3 is performed. Then, in step S130, it is determined whether or not the Ack signal with the own ID information sent from the receiver 3 has been received, and if the Ack signal is received, the frame transmission process is terminated. After that, the sleep state is entered, and when the transmission cycle is reached, the state automatically switches to the wake-up state to perform the process from step S120, and when the reception of the Ack signal is confirmed in step S130, the process of terminating the frame transmission process is repeated.

On the other hand, if an affirmative determination is made in step S115, the process proceeds to step S135, and a process of transmitting a frame storing data and ID information related to tire pressure to the receiver 3 is performed in an intermittent drive cycle. Then, in step S140, it is determined whether or not the Ack signal with the own ID information sent from the receiver 3 is received, and if it is received, the process proceeds to step S145. Then, for example, one day is set as the stop period, the sleep state is set, and when the stop period elapses, the state is automatically switched to the wake-up state, and the process from step S135 is repeated.

Although not shown in FIG. 4, when the vehicle stops, the absolute value of the acceleration detected by the acceleration sensor 21c becomes smaller than the first threshold value. When this state exceeds a certain period of time, it is assumed that the vehicle has finished traveling, not temporarily stopped. Therefore, the control units 22 of the traveling wheels 5a to 5d end the frame transmission for each periodic transmission cycle and go into the sleep state. As a result, the current consumption can be reduced. It is also possible that the user does not use the vehicle 1 at all during the day. In that case, even if the intermittent drive cycle is repeated, the receiver 3 does not receive the frame, and the frame transmission from the transceiver 2e is repeated for a long period of time. Therefore, if the Ack signal is not returned even after performing the frame transmission a predetermined number of times or continuously for a predetermined time, the frame transmission may be terminated and the stop period may be set again. In that case, the stop period shorter than one day may be set.

Next, receiver process including reception confirmation process and pressure detection process will be described. In the receiver 3, the control unit 33 executes the frame reception process every predetermined control cycle, and as described above, when the frame transmission is performed from the transceivers 2a to 2e, the frame is received and the Ack signal indicating the reception completion is returned and detects the tire pressure.

Figure 5:
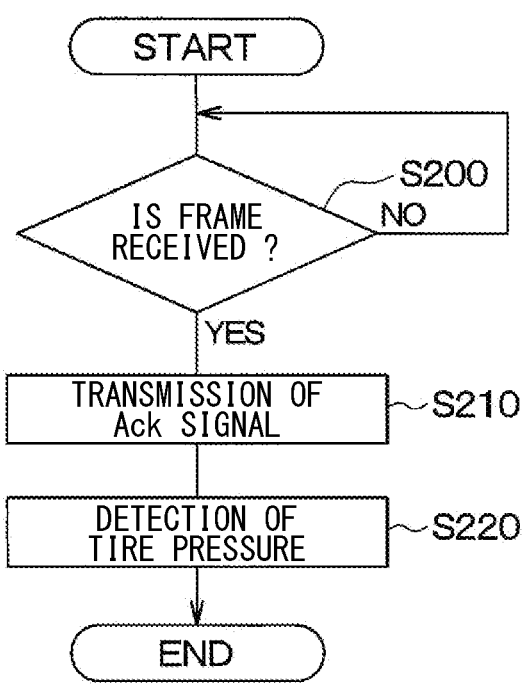
FIG. 5 is a flowchart of a receiver process executed by a control unit of the receiver.

As shown in FIG. 5, the control unit 33 executes the reception confirmation process in steps S200 and S210. First, in step S200, the control unit 33 determines whether or not the frame transmitted from the transceivers 2a to 2e has been received. This process is performed for each of the transceiver 2a to 2e, and the control unit 33 determines whether or not the frame to which the ID information is attached has been received for all the ID information of the transceiver 2a to 2e. If an affirmative determination is made here, the process proceeds to step S210, and the Ack signal reply process is performed. As a result, an Ac signal with ID information of the received transceiver 2a to 2e is returned. Based on this process, the transceivers 2a to 2d of the traveling wheels 5a to 5d stop frame transmission until the next transmission cycle, and the transceiver 2e of the spare wheels 5e sets a stop period, and for example, stops frame transmission for a day. The process of step S200 is repeatedly executed every control cycle until the affirmative determination is made in step S200.

After that, the process proceeds to step S220, and as a pressure detection process, the tire pressures of the traveling wheels 5a to 5d or the spare wheels 5e are detected based on the data related to the tire pressure data stored in the received frame. Based on this process, by transmitting the result of tire pressure detection to the display 4, the tire pressure at that time can be displayed, or the tire pressure drop can be displayed, and the driver can be informed of the tire pressure state.

FIG. 6 is a time chart showing a transmission reception relationship between the spare wheel 5e and the receiver 3 when the frame transmission process or the receiver process is performed. As shown in this figure, it is assumed that the ignition switch (hereinafter referred to as IG) is switched from off to on and the vehicle starts traveling. In this case, in the transceiver 2e of the spare wheel 5e, the absolute value of the acceleration detected by the acceleration sensor 21c is continuously larger than the first threshold value and smaller than the second threshold value. Based on this process, the control unit 22 detects that it belongs to the transceiver 2e attached to the spare wheel 5e, and performs frame transmission in the intermittent drive cycle. At this time, since the receiver 3 is also in operation, the frame transmitted from the transceiver 2e is received by the receiver 3, but even if it is not received, the frame is repeatedly transmitted from the transceiver 2e in the intermittent drive cycle, so that the receiver 3 reliably receives the frame. Then, when the receiver 3 receives the frame, the Ack signal is returned from the receiver 3 and received by the transceiver 2e. As a result, the stop period is set, and after one day, the frame transmission can be performed again from the transceiver 2e.

In this way, with respect to the spare wheel 5e, if the data regarding the tire pressure can be transmitted to the receiver 3, a stop period is provided so that the frame transmission is not performed. As a result, functions such as acceleration measurement can be put into a sleep state during the stop period, and current consumption can be reduced. Further, since bidirectional communication is performed between the transceiver 2e and the receiver 3, the transceiver 2e can grasp that the frame has been received by the receiver 3, and it is possible to reduce the current consumption while ensuring that the receiver 3 can reliably perform the data reception.

Further, when the stop period elapses, the frame transmission is repeatedly performed from the transceiver 2e in the intermittent drive cycle. Therefore, the tire pressure detection on the spare wheel 5e can be repeated every time the stop period elapses. As for the spare wheel 5e, it is sufficient that the tire pressure can be detected about once a day, for example. Therefore, if the stop period is one day, the current consumption of the transceiver 2e in the spare wheel 5e can be further reduced. Of course, the stop period may be shorter or longer than one day. When the stop period is shorter than one day, the reduction in the current consumption of the transceiver 2e of the spare wheel 5e becomes smaller when the stop period is one day. However, it is possible to detect the tire pressure at a certain frequency while preventing the frequency from becoming too high.

As described above, in the present embodiment, bidirectional communication can be performed between the transceiver 2a to 2e and the receiver 3. Therefore, when the frame reception is performed, the receiver 3 sends the Ack signal to the transceivers 2a to 2e, so that each of the transceivers 2a to 2e can accurately detect that the frame transmitted by itself has been received by the receiver 3.

Then, in the transceiver 2e of the spare wheel 5e, when the Ack signal arrives, the sleep state is set during the predetermined stop period, so that it is not necessary to repeatedly transmit the frame from the transceiver 2e even after the frame is received by the receiver 3. Therefore, it is possible to obtain a TPMS that can reliably receive data at the receiver 3 while reducing power consumption.

Second Embodiment

A second embodiment will be described. In the present embodiment, the method of setting the frame transmission timing is changed with respect to the first embodiment, and the other aspects are the same as those in the first embodiment. Therefore, only the parts different from the first embodiment will be described.

In the first embodiment, when the absolute value of the acceleration detected by the acceleration sensor 21c exceeds the first threshold value, it is determined that the vehicle is traveling, and the frames are transmitted from each of the transceivers 2a to 2e.

On the other hand, in the present embodiment, before the vehicle is traveling, that is, while the vehicle is stopped, the frame transmission is performed at a predetermined stop transmission cycle, for example, every 96 seconds. While the vehicle is traveling, the frame transmission is performed at a periodic transmission cycle shorter than the stop transmission cycle. Further, with respect to the transceiver 2e of the spare wheel 5e, a predetermined stop period is set when the Ack signal arrives, and the sleep state is set during the stop period so that frame transmission is not performed.

Specifically, in the traveling wheels 5a to 5d, the control unit 22 goes into the sleep state until the acceleration detected by the acceleration sensor 21c exceeds the traveling determination threshold value, for example, 8G, and performs the stop frame transmission by entering a wake-up state for each stop transmission cycle. Then, when the acceleration exceeds the travel determination threshold value, the control unit 22 enters a wake-up state, and performs frame transmission at each periodic transmission cycle so that the control unit 22 goes into a sleep state during the periodic transmission cycle in order to reduce the current consumption. In this way, while the vehicle is stopped, the frame transmission is performed at each stop transmission cycle, and frame transmission is performed at each periodic transmission cycle while the vehicle is traveling.

On the other hand, with respect to the spare wheel 5e, the control unit 22 detects only the acceleration generated by the vibration during traveling, not the acceleration caused by the tire rotation, by the acceleration sensor 21c, so that the frame transmission is not performed in the periodic transmission cycle during traveling. However, since the control unit 22 enters the wake-up state at each stop transmission cycle corresponding to the intermittent drive cycle, the frame transmission at the time of stop is performed, so that the frame transmission may be repeated more than necessary.

However, also in the present embodiment, as in the first embodiment, the stop period is set when the Ack signal is returned from the receiver 3, and the frame transmission is not performed during the stop period. Therefore, even after the frame is received by the receiver 3, it is not necessary to repeatedly transmit the frame from the transceiver 2e. Therefore, it is possible to obtain a TPMS that can reliably receive data at the receiver 3 while reducing power consumption.

Third Embodiment

A third embodiment will be described. The present embodiment makes it possible to change the alarm threshold value of the tire pressure in the transceivers 2a to 2e with respect to the first and second embodiments. Since other parts of the present embodiment is the same as that of the first and second embodiments, only the parts different from the first and second embodiments will be described.

In the first and second embodiments, with respect to the traveling wheels 5a to 5e and the spare wheel 5e, the transceivers 2a to 2e can be configured to detect the tire pressure by themselves. In that case, the receiver 3 transmits the alarm threshold value set by the user to each of the transceivers 2a to 2e, and each of the transceivers 2a to 2e can set the transmission cycle of frame transmission based on the transmitted alarm threshold value.

Specifically, when the user sets the alarm threshold value through an input device (not shown), for example, a display of a navigation system, the data is input to the receiver 3. Then, the alarm threshold data is transmitted to each of the transceivers 2a to 2e through the receiver 3. For example, when receiving a frame transmitted from each of the transceivers 2a to 2e and returning the Ack signal, the receiver 3 transmits a connection request signal. The connection request signal may be included in the Ack signal, or may be a signal different from the Ack signal. Then, when the connection between each of the transceivers 2a to 2e and the receiver 3 is formed, the alarm threshold data is transmitted from the receiver 3 to the transceivers 2a to 2e.

The alarm threshold data is transmitted to the transceivers 2a to 2e, and the alarm threshold value indicated by the alarm threshold data is set as a set value for determining that the tire pressure has decreased in the transceiver 2e. Therefore, it is possible for the transceivers 2a to 2e to detect a decrease in tire pressure based on the newly set alarm threshold value. Then, with respect to the spare wheel 5e, even if the stop period is provided, when at least one of the time when the tire pressure changes and the time when the tire pressure drops occurs, the frame transmission is performed as an interrupt process. For example, it is preferable that frame transmission is performed every relatively short transmission cycle. As a result, the frame transmission can be performed even at the timing when the frame transmission is not normally performed during the stop period, and if the transmission cycle is a short cycle, in an emergency, the tire pressure can be transmitted to the receiver 3 at a transmission cycle shorter than the stop period.

In this way, the user can change the alarm threshold value at own convenient timing, and can detect a decrease in tire pressure based on the alarm threshold value, and even during the stop period, in an emergency, the tire pressure can be transmitted to the receiver 3 at short transmission cycle. Therefore, also for the spare wheel 5e, the decrease in tire pressure can be transmitted to the user more quickly.

Fourth Embodiment

A fourth embodiment will be described. The present embodiment allows the user to memorize a time zone in which the user frequently uses the vehicle with respect to the first to third embodiments, and other parts of the present embodiment is the same as the first and second embodiments. Therefore, only the parts different from the first to third embodiments will be described.

In the present embodiment, the user stores a time zone in which the vehicle is used in the memory of the control unit 22 of each transceiver 2a to 2e, and the control unit 22 learns and memorizes the most frequently used time zones in that time zone. For example, the presence or absence of traveling is accumulated for each time zone divided into several minutes or several tens of minutes, and the integrated value is associated and stored for each time zone. Then, the transceiver 2e of the spare wheel 5e is set so that the frame transmission is performed during a frequently used time zone. Specifically, during the frequently used time zone, for example, the stop period ends at the most frequently used time, and the frame transmission is performed from that time.

By doing so, it is possible to increase the possibility that the frame is transmitted to the receiver 3 when the frame is transmitted from the transceiver 2e of the spare wheel 5e. Therefore, it is possible to shorten the period for performing the frame transmission in the intermittent drive cycle, and it is possible to further reduce the current consumption.

Here, the frame transmission from the transceiver 2e of the spare wheel 5e is performed at the most frequently used time, but the frame transmission is performed at any time within the frequently used time zone. Further, when there are a plurality of frequently used time zones such as 8:00 to 9:00 and 18:00 to 20:00, it is preferable to select the more frequently used time zone.

Other Embodiments

Although the present disclosure has been described in accordance with the above-described embodiments, the present disclosure is not limited to the above-described embodiments, and encompasses various modifications and variations within the scope of equivalents. In addition, while the various combinations and configurations, which are preferred, other combinations and configurations, including more, less or only a single element, are also within the spirit and scope of the present disclosure.

For example, in each of the above embodiments, the stop period is set to 1 day, that is, 24 hours, and the intermittent drive cycle is set to 96 seconds, but these can be changed as appropriate. For example, the stop period may be 23 hours, which is shorter than one day, or 25 hours or two days, which is longer than one day. Preferably, the stop period is set to 24 hours or less so that the tire pressure can be detected once a day.

Further, a timing other than the timing after each intermittent drive cycle or the stop period may be added so that the frame transmission is performed at three or more types of timings. For example, a request signal may be output from the receiver 3 when the tire pressure changes or decreases, and the frame transmission from the transceiver 2e may be performed at that timing.

Further, as the transceivers 2a to 2e, those attached to the air injection valve have been described as an example, but they may be provided in other places. Further, the acceleration sensor 21c is not limited to the one that detects the acceleration in the tire radial direction.

As an example, as the transceivers 2a to 2e, a tire-side device called a tire mount sensor arranged on a back surface of the tire tread, which is provided with a pressure sensor and capable of detecting tire pressure, may be applied. When the transceivers 22a to 22e are used as tire mount sensors, the detection signal output by the acceleration sensor 21c can also be used as a detection signal according to the magnitude of vibration in the tire tangential direction. In this case, an output voltage waveform that becomes the detection signal of the acceleration sensor 21c takes a maximum value at the start of ground contact when the portion of the tire tread corresponding to the location where the acceleration sensor 21c is arranged begins to touch the ground as the tire rotates. Further, the output voltage waveform takes a minimum value at the end of ground contact when the portion of the tire tread corresponding to the arrangement portion of the acceleration sensor 21c is not grounded as the tire rotates. Therefore, it is possible to detect that the vehicle is traveling based on the detection signal of the acceleration sensor 21c. Further, in the case of the spare wheel 5e, the output voltage waveform of the acceleration sensor 21c is not a periodic waveform but a waveform corresponding to the vibration accompanying the traveling of the vehicle 1. Then, since it is possible to detect that the vehicle 1 is traveling from this output voltage waveform, it is also possible to detect the transceiver 2e of the spare wheel 5e.

In the case where the tire mount sensor is used as the transceivers 2a to 2e, the case where the acceleration sensor 21c detects the vibration in the tire tangential direction has been described, but the same can be done by detecting vibration in another direction, for example, in the tire radial direction. Further, in the first to fourth embodiments, the acceleration in the tire radial direction, that is, the acceleration in the centrifugal direction is detected, but the acceleration in the tire tangential direction may be detected. Since the acceleration in the tire tangential direction also increases or decreases as the vehicle 1 travels, it is possible to detect that the vehicle 1 is traveling based on the acceleration.

Further, when the tire mount sensor is used as the transceivers 2a to 2d, a piezoelectric element can be used instead of the acceleration sensor 21c. Since the piezoelectric element generates an output voltage according to the stress, the output voltage having a waveform similar to that of the acceleration sensor 21c is generated as the tire tread is deformed. Therefore, it is possible to detect that the vehicle 1 is traveling by using the output voltage of the piezoelectric element as a detection signal.

In each of the above embodiments, the portion of the TPMS provided on the vehicle body 6 side is comprehensively described as the receiver 3, but the receiver 3 does not necessarily have to have one configuration. For example, the antenna 31 and the transceiver portion 32 that perform the reception function and the control unit 33 that performs the tire pressure detection function may be provided at different locations.

What is claimed is:

1. A tire pressure monitoring system comprising:
a transceiver provided on a spare wheel in a vehicle and a receiver provided on a vehicle body; and
a receiver provided on the vehicle body, wherein
the transceiver includes
a sensing unit having a pressure sensor configured to output a detection signal indicating a tire pressure of the spare wheel,
a first control unit configured to process a detection signal indicating the tire pressure and create a frame stored as data related to the tire pressure, and
a first transceiver portion configured to transmit the frame, the receiver includes a second transceiver portion configured to receive the frame and transmit a response signal indicating that the frame is received, and a second control unit configured to detect the tire pressure based on the data related to the tire pressure stored in the frame when the frame is received, and configured to transmit the response signal from the second transceiver portion, after the transceiver performs frame transmission in an intermittent drive cycle in which frame transmission is performed at predetermined transmission cycles, upon receiving the response signal, the transceiver sets a stop period longer than the transmission cycle of the intermittent drive cycle, and stops the frame transmission during the stop period, and the transceiver transmits the frame even during the stop period, when the tire pressure of the spare wheel is detected based on the data related to the tire pressure, and when at least one of change amount in the tire pressure from a previous frame transmission exceeds a threshold value, and the tire pressure becomes equal to or less than a set value occurs, the receiver transmits date of an alarm threshold value to the transceiver, the transceiver determines a decrease in tire pressure by using the alarm threshold value indicated by the alarm threshold data transmitted from the receiver as a set value, and when returning the response signal, the receiver transmits a connection request signal by including it in the response signal or separately from the response signal, and transmits the data of the alarm threshold value to the transceiver when the connection with the transceiver is formed.

2. The tire pressure monitoring system according to claim 1, wherein
the first control unit sets a time of 24 hours or less as the stop period.

3. The tire pressure monitoring system according to claim 1, wherein
the sensing unit includes an acceleration sensor configured to output a detection signal according to the acceleration generated in the spare wheel, and
when the acceleration indicated by the detection signal of the acceleration sensor is larger than the first threshold value and smaller than the second threshold value larger than the first threshold value, the first control unit determines that it is attached to the spare wheel, and performs the frame transmission at each predetermined transmission cycle.

4. A tire pressure monitoring system comprising:
a transceiver provided on a spare wheel in a vehicle and a receiver provided on a vehicle body; and
a receiver provided on a vehicle body, wherein
the transceiver includes
a sensing unit having a pressure sensor configured to output a detection signal indicating a tire pressure of the spare wheel,
a first control unit configured to process a detection signal indicating the tire pressure and create a frame stored as data related to the tire pressure, and
a first transceiver configured to transmit the frame, the receiver includes
a second transceiver portion configured to receive the frame and transmit a response signal indicating that the frame is received, and
a second control unit configured to detect the tire pressure based on the data related to the tire pressure stored in the frame when the frame is received, and configured to transmit the response signal from the second transceiver portion, after the transceiver performs frame transmission in an intermittent drive cycle in which frame transmission is performed at predetermined transmission cycles, upon receiving the response signal, the transceiver sets a stop period longer than the transmission cycle of the intermittent drive cycle, and stops the frame transmission during the stop period, and the first control unit stores a frequently used time zone of the vehicle, sets the stop period so that the stop period ends during the frequently used time zone and the frame transmission is performed during the time zone.

5. The tire pressure monitoring system according to claim 4, wherein
the transceiver transmits the frame even during the stop period, when the tire pressure of the spare wheel is detected based on the data related to the tire pressure, and when at least one of change amount in the tire pressure from a previous frame transmission exceeds a threshold value, and the tire pressure becomes equal to or less than a set value occurs.

6. The tire pressure monitoring system according to claim 5, wherein
the receiver transmits data of an alarm threshold value to the transceiver, and
the transceiver determines a decrease in tire pressure by using the alarm threshold value indicated by the alarm threshold value data transmitted from the receiver as a set value.

7. The tire pressure monitoring system according to claim 6, wherein
when returning the response signal, the receiver transmits a connection request signal by including it in the response signal or separately from the response signal, and transmits the data of the alarm threshold value to the transceiver when the connection with the transceiver is formed.

* * * * *